Feb. 6, 1951  C. A. HASSLACHER  2,540,616
MOWING MACHINE
Filed Oct. 12, 1948  3 Sheets-Sheet 1
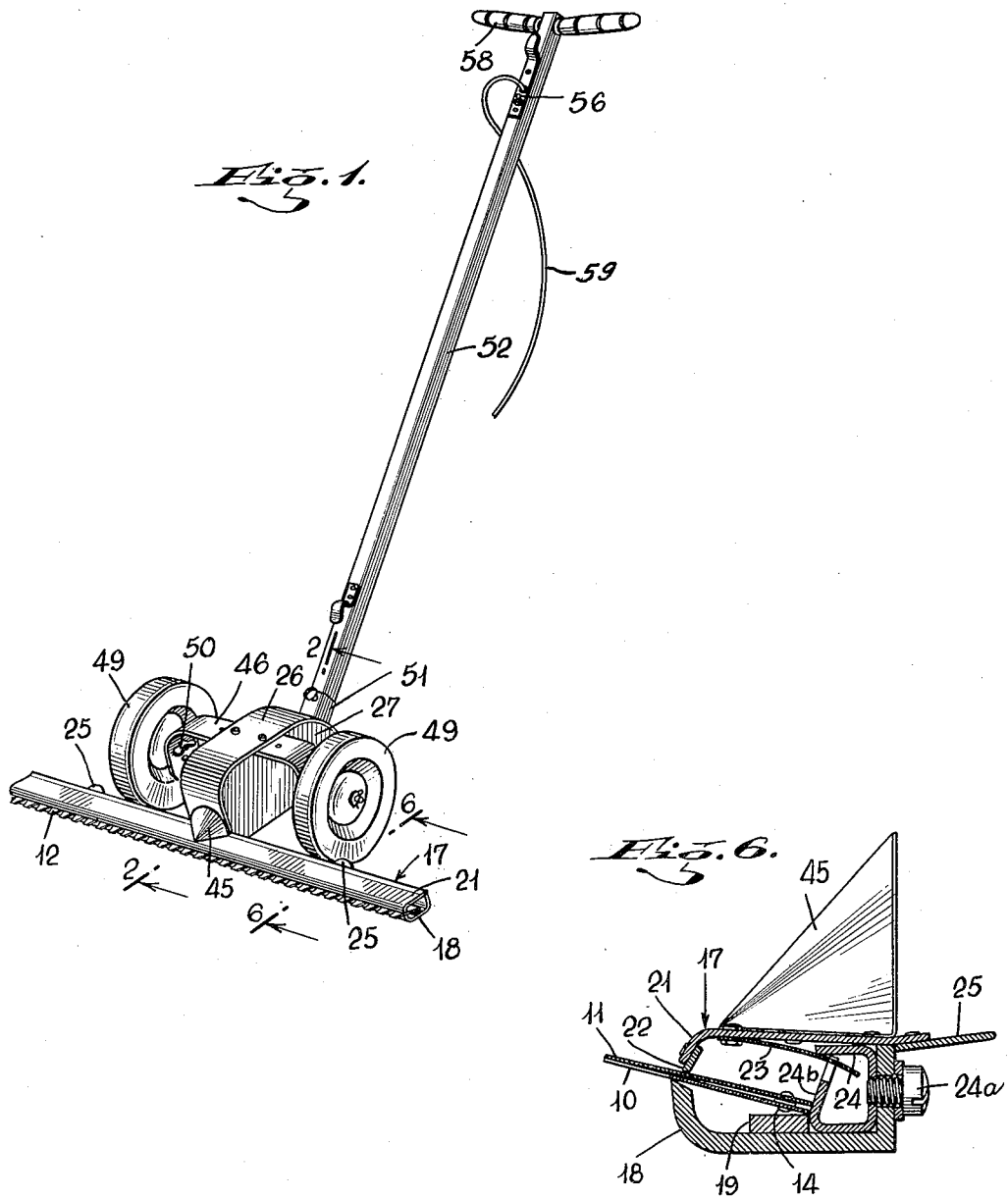
INVENTOR
CARL A. HASSLACHER
BY
Burgess, Ryan & Hicks
ATTORNEY Feb. 6, 1951     C. A. HASSLACHER     2,540,616
MOWING MACHINE
Filed Oct. 12, 1948                 3 Sheets-Sheet 2
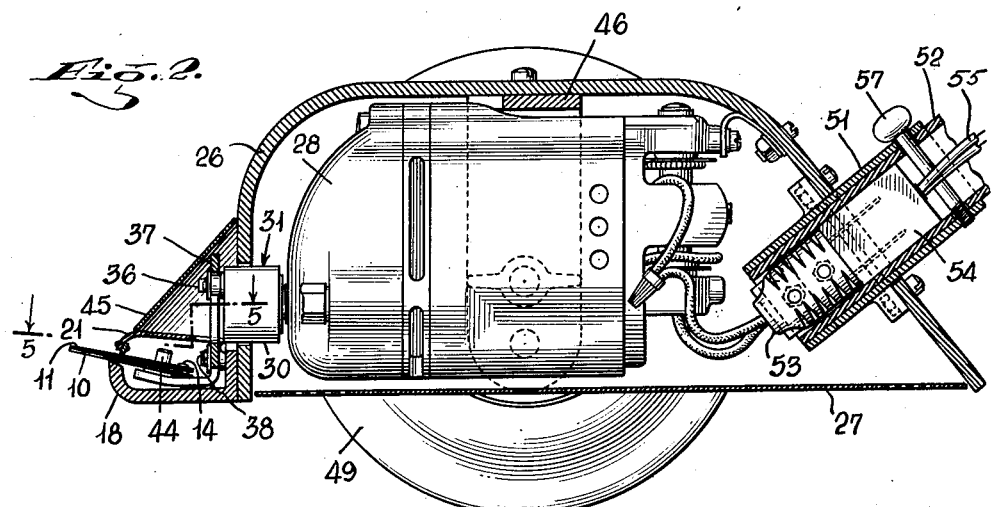
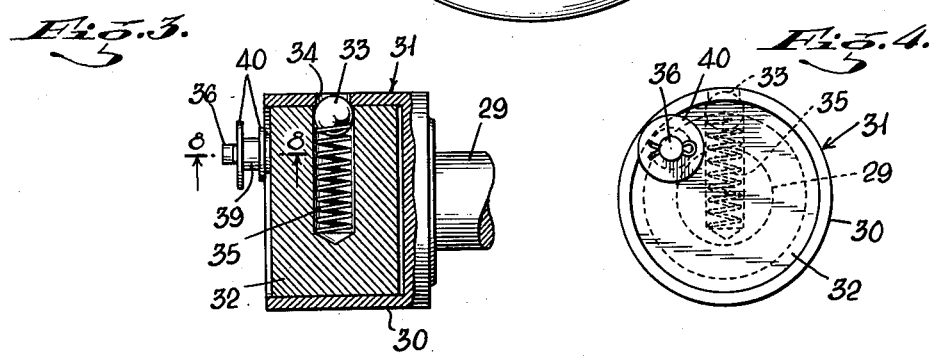
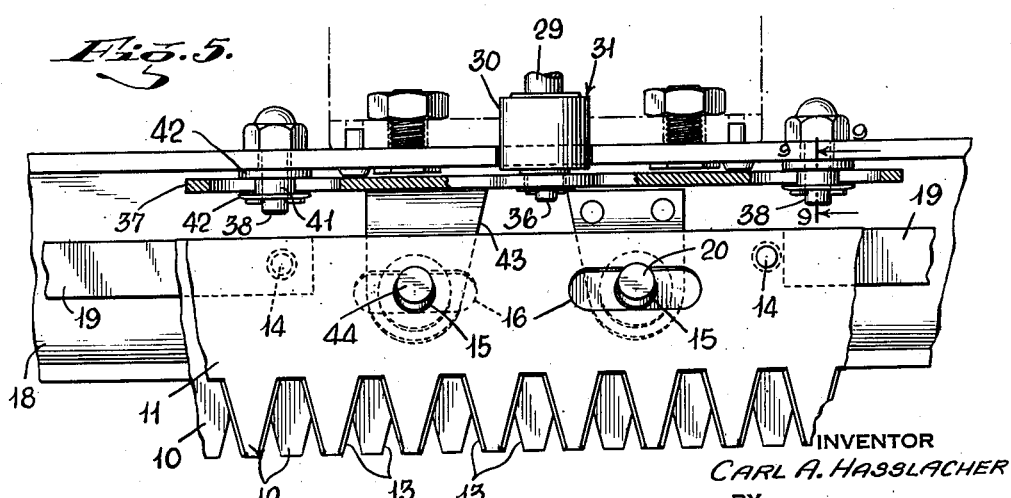
INVENTOR
CARL A. HASSLACHER
BY
Burgess, Ryan & Hicks
ATTORNEY

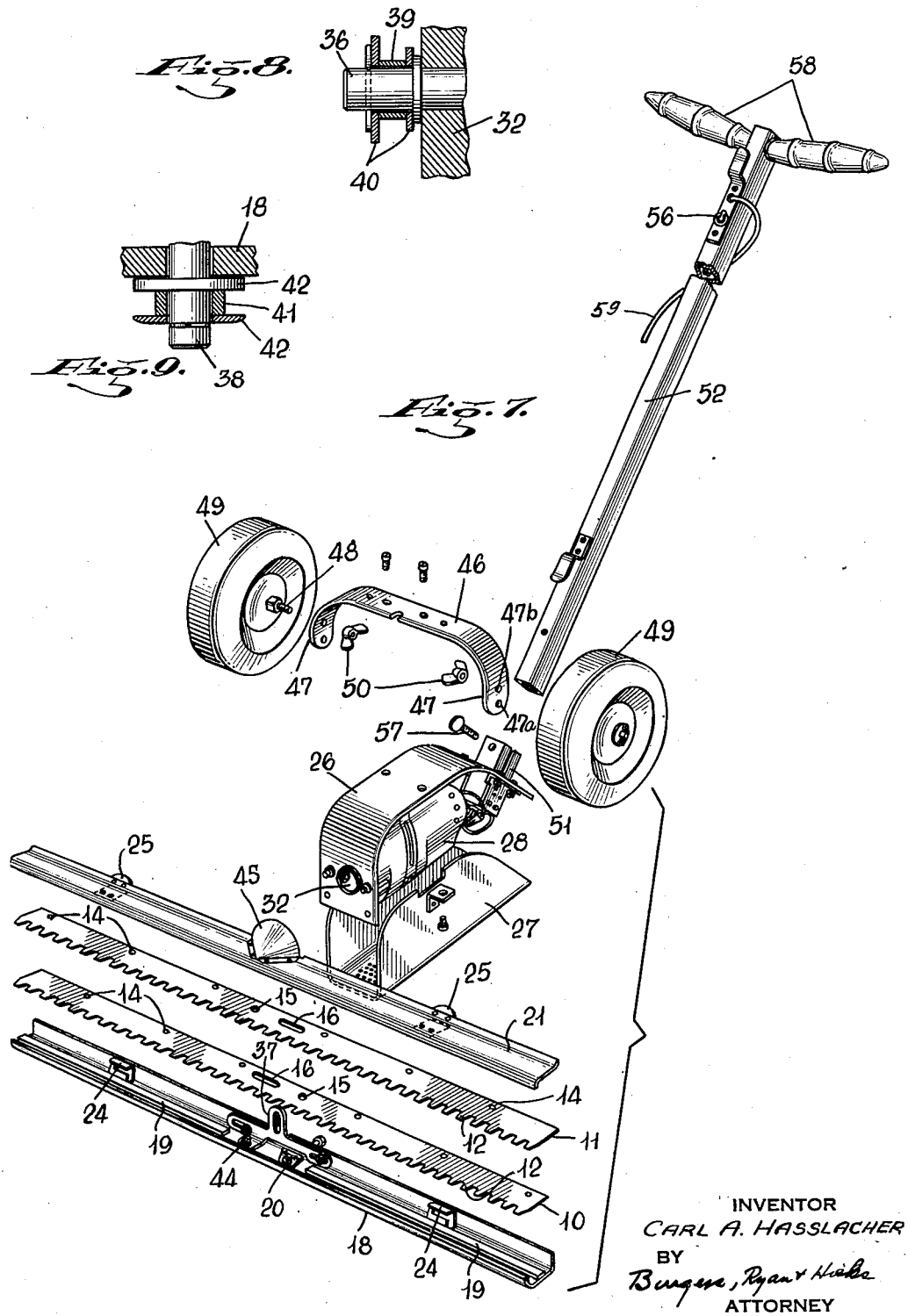

Patented Feb. 6, 1951

2,540,616

UNITED STATES PATENT OFFICE 2,540,616

MOWING MACHINE

Carl A. Hasslacher, Scarsdale, N. Y.

Application October 12, 1948, Serial No. 54,150

13 Claims. (Cl. 56—26.5)

The present invention relates to improvements in mowing machines and relates, more particularly, to a power operated grass mower for domestic or home use.

To provide a better understanding of the various features and advantages of the present invention, reference is made here to some of the general characteristics of mowing machines as such machines have been known and used prior to the present invention. Mowing machines, at first horse drawn, and subsequently mechanized have long been used for agricultural purposes such as mowing tall grass or grain. These agricultural mowing machines have a comb-like stationary bar and a reciprocating bar with knives or cutters. The reciprocating bar in such machines which is sometimes called the sickle-bar, is of rather massive construction, so that the cutters will be inflexibly held in proper alignment even though they may strike various obstacles during their operation. Due to the heavy construction of the reciprocating bar, considerable power is required to move it even at relatively low speeds and because of the inertia of this heavy bar it is not feasible to move it at high speeds.

While such a mowing machine is suitable for agricultural purposes, its weight and the power required to operate it make it impractical for domestic use. On the other hand, the customary domestic lawn mower, either motor or hand operated, of the type in which the blades rotate against a fixed bed-knife, will not effectively cut grass more than a few inches tall. While smaller mowers intended for general use and which are designed so that the mower will cut tall grass, as well as shorter lawn grass have been produced, such mowers embody the teachings of the agricultural mowing machines, regarding the use of a fixed comb-like bar and a heavy cutter-bar. Thus, although these machines are smaller and lighter than the agricultural mowing machine, they are very heavy and cumbersome for domestic use and require considerable power to operate them. For example, one of the lightest of such machines which cuts a thirty-six inch swath, weighs 140 pounds, has a reciprocating cutter-bar weighing 3 pounds, and requires a one and one-half horsepower motor to operate it. The cutting bar in such a machine, like that of the agricultural mowing machine must be operated at relatively low speed because of its weight.

In contrast to the comb-like stationary bar and a heavy inflexible cutter-bar described above, a mower embodying the present invention utilizes a toothed stationary blade, and a toothed reciprocating blade which are identical and interchangeable. The cutting teeth on such blades are flexible and the entire blade may be made of an extremely light, flexible, material such as clock-spring steel. Such blades have been made from clock spring steel that is only twenty-five thousandths of an inch thick and have operated very satisfactorily. The use of such light weight flexible blades is directly contrary to the teachings of the agricultural mowing machines and the domestic mower mentioned above. It permits the reciprocating blade to be driven at high speed without excessive vibration, and with a minimum of power, so that the overall weight of the mower is reduced to a minimum. For example a mower embodying the present invention, which will cut a twenty-four inch swath through grass of any height, may be driven by a high speed electric motor developing less than $\frac{1}{10}$ horsepower, and weighs only ten pounds. These high speed reciprocating blades may weigh as little as three ounces or less and can be reciprocated at high speeds without excessive vibration. Such a mower handles with the ease of a vacuum cleaner and cuts very rapidly and efficiently.

The manner in which the flexible blades are held in relation to each other is hereinafter described in greater detail. It provides that the rear edges of the blades are slightly separated so that one blade is tilted in relation to the other blade. This causes the cutting edges on the teeth of the reciprocating blade to cross the opposed cutting edges on the teeth of the stationary blade, and assures positive and intimate contact between the cutting edges of the opposed teeth. When the cutting teeth are made integral with the blade, the flexibility of the material from which the blade is made permits the teeth to flex transversely to accommodate this crossing action. The advantages of this crossing of the cutting edges can be achieved only if the teeth are made flexible and cannot be attained by the use of an inflexible cutter-bar such as is embodied in the mowing machines previously described.

I have discovered that because a light weight blade can be moved at such high velocity, it will slice through matter that would turn the edge of a heavy, slower moving, blade. In addition, such blades may be so inexpensively manufactured that a supply may be kept on hand, and a worn or damaged blade may be discarded and replaced as is done with ordinary razor blades. Since the blades are identical and interchangeable only one type of blade need be produced by the manufacturer, and kept on hand by the user.

so spaced along the rear edges of the blades that when the blades are so superimposed the protuberances 14 on the upper blade 11 are positioned approximately half way between the protuberances 14 on the lower blade 10. These protuberances 14 serve to slightly separate the rear edges of the blades 10 and 11 when they are thus superimposed, and in operating position. Because one blade is tilted in this manner in relation to the other blade, the teeth of one blade are depressed into the openings between the teeth of the other blade, so that the plane of the cutting teeth on one blade crosses the plane of the cutting teeth on the other blade with the opposed cutting edges of the teeth slightly crossed. This produces a positive and intimate contact between the cutting edges of the opposed teeth at the point where the cutting action is taking place. Such a positive and intimate contact of the cutting edges is essential to an efficient cutting action. When the blades are made of flexible material or the teeth on one of the blades are flexible, the teeth on the blades or blade can flex so that the teeth of one blade can ride up over the teeth of the other blade when one of the blades is reciprocated even though their respective cutting edges are crossed in the manner described above. The above described positive and intimate contact between the cutting edges may be achieved only if at least one blade has teeth that will flex.

As one blade is reciprocated in relation to the other blade, at the beginning and end of each stroke, the teeth of one blade coincide with the teeth of the other blade. Thus the space between the teeth of the blades is wide open both at the beginning and at the end of each stroke to admit grass between the teeth. Furthermore, the teeth cut both on the forward and return stroke of the reciprocating blade, and the cutting action takes place while the blade is moving at its highest velocity.

On opposite sides of the transverse center line of the interchangeable cutting blades 10 and 11 there is a hole 15 and a slot 16. Thus, when the upper blade 11 is inverted by turning it end over end, and is superimposed upon the lower blade 10, the slot 16 in one blade registers with the hole 15 in the other blade, as shown in Fig. 5.

The cutting blades 10 and 11 are carried in operating position by a cutter-head indicated generally at 17, Fig. 1. The cutter-head 17 consists of an angular member or base 18 on which the lower blade 10 rests. The base 18 of the cutter-head 17 extends along the length of the blades 10 and 11 and its front edge is curved upwardly to support the blades 10 and 11 with only their teeth 12 projecting beyond the front edge of the base 18. The back of the lower blade 10 rests on a rib 19 extending along the inside of the base 18. A fixed pin 20 secured to the base 18 extends through the hole 15 in the lower or stationary blade 10, and through the slot 16 in the upper or reciprocating blade 11. The pin 20, thus, holds the lower blade 10 in fixed position, but permits the upper blade 11 to be reciprocated relative to the lower blade.

A second pin 44 secured to an extension 43 of a pitman 37 extends through the slot 16 in the lower or stationary blade 10, and through the hole 15 in the upper or reciprocating blade 11. Thus when the pitman 37 is reciprocated as hereinafter described, the pin 44 causes the upper blade 11 to be reciprocated while the fixed pin 20 holds the lower blade stationary. If it is desired, the lower cutting blade may also be reciprocated in a similar manner to obtain movement of each of the blades relative to the other during the cutting stroke.

A removable cover 21 of sheet metal with its front edge curved downwardly extends along the length of the cutter-head 18. The front edge of the cover 21 rests on the upper blade 11 and presses it firmly against the lower blade 10. To prevent excessive wear on the front edge of the cover 21, it may be provided with a hardened steel strip 22 that bears against the upper blade 11. The cover is removably secured to the base 18 and is held down on the upper blade 11 by a pair of flat springs 23. The flat springs 23 are secured to the underside of the cover 21 and engage with clips 24 secured to the base 18 of the cutter-head 17 by the screws 24a. The clips 24 also have upturned ends 24b that engage with and position the rear edges of the blades 10 and 11 in the cutter-head 17.

Tabs or catches 25 are secured to the cover 21 and engage with the back edge of the base 18 to hold the cover 21 in place in cooperation with the springs 23. By raising the tabs 25, the cover 21 may be easily removed from the base 18 by pushing it forward to disengage the springs 23 from the clips 24. With the cover 21 removed, the blades 10 and 11 may be readily removed, when desired for repair or replacement, by merely lifting them off of the two pins 20 and 44.

The base 18 of the cutter-head 17 is bolted to the top plate 26 of a motor housing which with a bottom 27 encloses a suitable electric motor 28 for reciprocating the upper cutting blade 11. As shown in Fig. 3, the shaft 29 of the motor 28 carries a driving member 30 of an overload clutch 31. The driving member 30 of the clutch 31 engages with a driven member 32 of the clutch that is rotatably mounted within the driving member. The driving member 30 and the driven member 32 are releasably engaged through a detent consisting of a spring backed ball 33 carried by the driven member and which engages with an aperture 34 in the driving member 30. Under normal operating conditions, the two parts 30 and 32 of the clutch are secured together by the ball 33 and rotate together, but if an excessive load such as a piece of fence wire being caught between the cutting blades prevents the driven part 32 from rotating, the ball 33 is forced in against the pressure of the spring 35 thereby releasing the driving part 30 and permitting it to rotate freely while the driven part 32 stands still. When the overload is removed, the detent again takes hold and the two parts rotate together. This clutch not only protects the motor from overloading, but minimizes the chance of damage to the blades and blade-moving mechanism. With this type of clutch there is not need to replace broken parts as with a shear pin.

The driven member 32 of the overload clutch 31 carries a crank pin 36 that is connected to the pitman 37 that translates the rotary motion of the crank 36 to a reciprocatory linear motion. The pitman 37 is slidably mounted on pins 38 secured to the base 18 of the cutter-head 17. The crank pin 36 is provided with a hardened steel roller 39 on which the pitman 37 slides and the pitman is retained on the roller 39 by hardened steel retaining washers 40 that are held in place on the crank pin 36 by a cotter pin. The pins 38 in the base 18 are similarly provided with rollers 41 on which the pitman 37 reciprocates and retaining washers 42 that are held in place on the pins 38 by means of cotter pins.

The extension 43 of the pitman 37 extends partially across the base 18 and beneath the cutting blades 10 and 11 that are carried on the base 18. The pin 44 carried on the extension 43 extends upwardly through the slot 16 in the lower or fixed cutting blade 10 and the hole 15 in the upper or reciprocating cutting blade 11 with which it engages as previously described. Thus, when the shaft 29 of the electric motor 28 is rotated, a reciprocating motion is impared to the upper cutting blade 11 causing the cutting edges 13 of the teeth 12 of the upper cutting blade 11 to be moved across the cutting edges 13 of the teeth 12 of the lower cutting blade 10. A shield 45 in the form of a half cone that is carried by the cover plate 21 of the cutter-head 17 encloses the connection of the pitman 37 to the crank pin 36.

Because of the lightness of the cutting blade 11 that is reciprocated, it may be driven at high speeds with very little power and without excessive vibration. A suitable motor for a mower such as that illustrated herein is a 110 volt electric motor of approximately $1/12$ H. P. such as is used in a small geared electric drill which operates at 2250 R. P. M. This produces 4500 cutting strokes per minute. However, if desired, a small, high speed gasoline engine may be used to power the mower. At the high speed reciprocation of the cutting blade 11 an extremely rapid and efficient cutting operation is made possible with such a mower.

A wheel supporting yoke 46 is fastened to the top plate 26 of the motor housing and extends on either side thereof. The downwardly extending arms 47 of the yoke 46 are each provided with a pair of spaced holes 47a and 47b to receive the axles 48 of a pair of wheels 49 on which the mower runs. The axles 48 of the respective wheels 49 may be placed in either the upper holes 47b or the lower holes 47a depending on the height of the cut desired. With the mower at rest, as illustrated, the cutting blades 10 and 11 are tilted upwardly at a slight angle, but when the mower is in operation, the rear of the mower is raised slightly by the operator and the cutting blades 10 and 11 assume an approximately horizontal position or they may be at a slight downward angle.

A socket 51 is located at the rear of the top plate 26 of the motor housing to receive the end of a handle 52 for moving the mower about as desired. The handle 52 fits into the socket 51 and the socket 51 contains the male half 53 of an electrical connector plug that is electrically connected to the motor 28. The handle 52 contains the female half 54 of the connector plug and when the handle 52 is inserted in the socket 51, the parts 53 and 54 of the connector plug are joined. The handle 52 may be hollow so that wires 55 from the connector plug 54 may be located inside of the handle and connected to a conveniently located switch 56. A rubber covered connector cord 59 of a desired length is connected to the switch 59 and connects the mower to a convenient source of electrical power for operating the mower. When the mower is not in operation, this connector cord may be wound on two suitable hooks mounted on the handle. The handle 52 is removably secured in the socket 51 by a thumbscrew 57 that extends through walls of the socket 51 and the walls of the handle 52.

at least one of said blades and the cutting teeth thereon being flexible transversely whereby the cutting teeth on said blade are permitted to ride over the cutting teeth of the other blade during relative movement of the blades, and a cover removably secured to the cutter head, said cover having a forwardly disposed edge engaging with the top of the upper blade at a point to rear of the point at which the front of the lower blade rests on the cutter head, and maintaining said upper blade in tilted relation with respect to the lower blade.

5. In an electrically powered grass mover, the combination including a cutter head, a pair of wheels supporting said cutter head in spaced relation to the surface of the ground, a pair of cutting blades having cutting teeth along their front edges with the teeth on at least one of said blades being flexible transversely of the blade, said cutting blades being supported in said cutter head with their cutting teeth extending beyond the cutter head, separating means interposed between the blades at the rear edges thereof, said means tilting said blades relative to each other with the plane of the cutting teeth of one blade intersecting and crossing the plane of the cutting teeth on the other blade when the teeth are in cutting engagement, an electrically operable motor, a reciprocable member connected to one of said cutting blades and an overload clutch connecting the reciprocable member to the electric motor.

6. In an electrically powered grass mover, the combination as defined in claim 5 including a pair of spaced pins secured to the cutter head, a removable roller carried on each of said pins, said pins and rollers supporting the reciprocable member and a crank pin on the shaft of the electric motor and a removable roller carried thereon with the reciprocable member engaging with the roller on said crank pin.

7. In a grass mower of the type described, the combination of a pair of relatively reciprocable opposed cutting blades, a series of cutting teeth extending along the front edges of each of said blades, each of said cutting teeth having cutting edges along opposite sides thereof with the inner ends of the cutting teeth on each blade being spaced from the inner ends of the cutting teeth adjacent thereto on said blade, at least one of said blades and the cutting teeth thereon being made of thin, resilient material and being flexible transversely and separating means interposed between the rear edges of the opposing blades, said separating means tilting the blades with respect to each other and at an angle where the plane of the cutting teeth on one of the blades intersects and crosses the plane of the cutting teeth on the opposing blade at the cutting edges thereof.

8. In a grass mower of the type described, the combination of a pair of opposed cutting blades, at least one of said blades being reciprocable relative to the other of said blades, each of said blades being flexible transversely and having a series of cutting teeth extending along the front edge thereof and means for separating the rear edges of the blades and tilting the blades with respect to each other at an angle where the plane of the cutting teeth of one blade intersects and crosses the plane of the cutting teeth on the other blade at the cutting edges of said teeth, said means comprising a protuberance extending from the opposing faces of each of the blades at the rear edges thereof, said protuberance engaging with and bearing against the opposing face of the other blade at a point spaced from the protuberance on the opposing blade when the blades are in cutting engagement.

9. In a grass mower of the type described, the combination as defined in claim 8 wherein each of said blades has an elongated opening and an opening shaped to engage with a pin, said openings being spaced apart with the elongated opening in the respective blades registering with the pin-engaging opening in the other blade when the blades are in cutting engagement, said elongated opening in each blade permitting relative movement between said blade and a pin extending through the pin-engaging opening of the other blade and into said elongated opening.

10. In a grass mower of the type described, the combination of a pair of opposed cutting blades, at least one of said blades being reciprocable relative to the other of said blades, each of said blades being flexible transversely and having a series of cutting teeth extending along the front edge thereof and means for separating the rear edges of the blades and tilting the blades with respect to each other at an angle where the plane of the cutting teeth of one blade intersects and crosses the plane of the cutting teeth on the other blade at the cutting edges of said teeth, said means comprising a series of protuberances extending from the opposing faces of each of the blades at the rear edges thereof, the protuberances on one blade engaging with and bearing against the opposing face of the other blade at points spaced from the protuberances on the other blade when the blades are in cutting engagement.

11. In a grass mower, a cutting blade of thin, resilient material, said blade having cutting teeth formed along one edge thereof and a number of protuberances extending from one face of the blade near the other edge thereof, said teeth being flexible transversely of the blade and the protuberances being asymmetrically spaced along the length of the blade.

12. In a grass mower, a cutting blade as defined in claim 11 wherein said blade has a pair of spaced openings therein, one of said openings being elongated lengthwise of the blade in relation to the length of the other opening.

13. In a grass mower, a cutting blade of thin, resilient material, said blade having a series of cutting teeth formed along one edge thereof, each of said teeth being flexible transversely with respect to the blade and having its inner ends spaced from the inner ends of the teeth adjacent thereto on the blade and a number of protuberances extending from one face of the blade near the other edge thereof, said protuberances being asymmetrically spaced along the length of the blade.

CARL A. HASSLACHER.

REFERENCES CITED

The following references are of record in the file of this patent:

UNITED STATES PATENTS

| Number | Name | Date |
| --- | --- | --- |
| 2,002,396 | Hite | May 21, 1935 |
| 2,458,200 | Renfroe et al. | Jan. 4, 1949 |